(12) United States Patent
Ohno

(10) Patent No.: US 11,969,906 B2
(45) Date of Patent: Apr. 30, 2024

(54) COLLABORATIVE ROBOT SYSTEM AND ASSEMBLY SET THEREOF

(71) Applicant: TOYOTA JIDOSHA KABUSHIKI KAISHA, Toyota (JP)

(72) Inventor: Satoru Ohno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 17/655,458

(22) Filed: Mar. 18, 2022

(65) Prior Publication Data

US 2022/0314456 A1 Oct. 6, 2022

(30) Foreign Application Priority Data

Apr. 5, 2021 (JP) .................................. 2021-064132

(51) Int. Cl.
*B25J 9/16* (2006.01)
(52) U.S. Cl.
CPC .................................. *B25J 9/1697* (2013.01)
(58) Field of Classification Search
None
See application file for complete search history.

(56) References Cited

U.S. PATENT DOCUMENTS

2019/0217472 A1* 7/2019 Nakasu .................. B25J 9/1676

FOREIGN PATENT DOCUMENTS

| EP | 2286963 A1 * | 2/2011 | ............. B23P 21/00 |
|---|---|---|---|
| JP | 2016-516592 A | 6/2016 | |
| JP | 2019-51589 A | 4/2019 | |
| JP | 2019-63967 A | 4/2019 | |
| JP | 2019-123022 A | 7/2019 | |
| WO | WO 2014/138123 A1 | 9/2014 | |

OTHER PUBLICATIONS

M. Cramer, K. Kellens and E. Demeester, "Probabilistic Decision Model for Adaptive Task Planning in Human-Robot Collaborative Assembly Based on Designer and Operator Intents," in IEEE Robotics and Automation Letters, vol. 6, No. 4, pp. 7325-7332, Oct. 2021, doi: 10.1109/LRA.2021.3095513. (Year: 2021).*

* cited by examiner

*Primary Examiner* — Khoi H Tran
*Assistant Examiner* — Bryant Tang
(74) *Attorney, Agent, or Firm* — Oblon, McClelland, Maier & Neustadt, L.L.P.

(57) ABSTRACT

A collaborative robot system having high safety when executing tasks in collaboration with operators and which can be finely adjusted at a site is achieved. A collaborative robot system according to an embodiment of the present disclosure is assembled by an operator for executing a task in collaboration with the operator. The collaborative robot system includes a driving unit, an operation unit configured to operate by a driving force of the driving unit to execute the task, a control unit configured to control the driving unit, a program executed by the control unit, a safety securing unit including a cover covering the operation unit or a sensor configured to detect contact of the operator with the operation unit, and an interface, an input apparatus of the operator being connected to the interface in order to modify the program.

4 Claims, 3 Drawing Sheets

COLLABORATIVE ROBOT SYSTEM AND ASSEMBLY SET THEREOF

CROSS REFERENCE TO RELATED APPLICATIONS

This application is based upon and claims the benefit of priority from Japanese patent application No. 2021-64132, filed on Apr. 5, 2021, the disclosure of which is incorporated herein in its entirety by reference.

BACKGROUND

The present disclosure relates to a collaborative robot system and assembly set thereof, and, for example, to a collaborative robot system and assembly set thereof assembled by an operator for executing a task in collaboration with the operator.

A general industrial robot as disclosed in Japanese Unexamined Patent Application Publication No. 2019-63967 is large in size, and is brought into and installed in a site such as a factory as a finished product. Such industrial robots are not intended to collaborate with operators and are fenced off. Therefore, general industrial robots are not expected to be in contact with operators and are not equipped with safety apparatuses.

SUMMARY

The applicant has found the following problems. Preferably, an operator and an industrial robot can collaborate to efficiently execute a desired task. However, general industrial robots are not intended to collaborate with operators, and it is desired to improve the safety of the general industrial robots. In addition, since general industrial robots are brought into sites as finished products, it is difficult for operators to finely adjust the industrial robots at the site.

The present disclosure has been made in view of such problems, and achieves a collaborative robot system which has high safety when executing tasks in collaboration with operators and can be finely adjusted at a site an assembly set thereof.

In an example aspect of the present disclosure, a collaborative robot system is assembled by an operator for executing a task in collaboration with the operator, and the collaborative robot system includes:

a driving unit;

an operation unit configured to operate by a driving force of the driving unit to execute the task;

a control unit configured to control the driving unit;

a program executed by the control unit;

a safety securing unit including a cover covering the operation unit or a sensor configured to detect contact of the operator with the operation unit; and an interface, an input apparatus of the operator being connected to the interface in order to modify the program.

In the above collaborative robot system, the operation unit may include three or less operating shafts.

In another example aspect of the present disclosure, an assembly set for a collaborative robot system includes a combination of the driving unit, the operation unit, the program, the safety securing unit, and the interface for assembling the above-described the collaborative robot.

According to the present disclosure, it is possible to achieve a collaborative robot system which has high safety when executing tasks in collaboration with operators and can be finely adjusted at a site an assembly set thereof.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. In order to clarify the explanation, the following description and drawings are simplified as appropriate.

Figure 1:
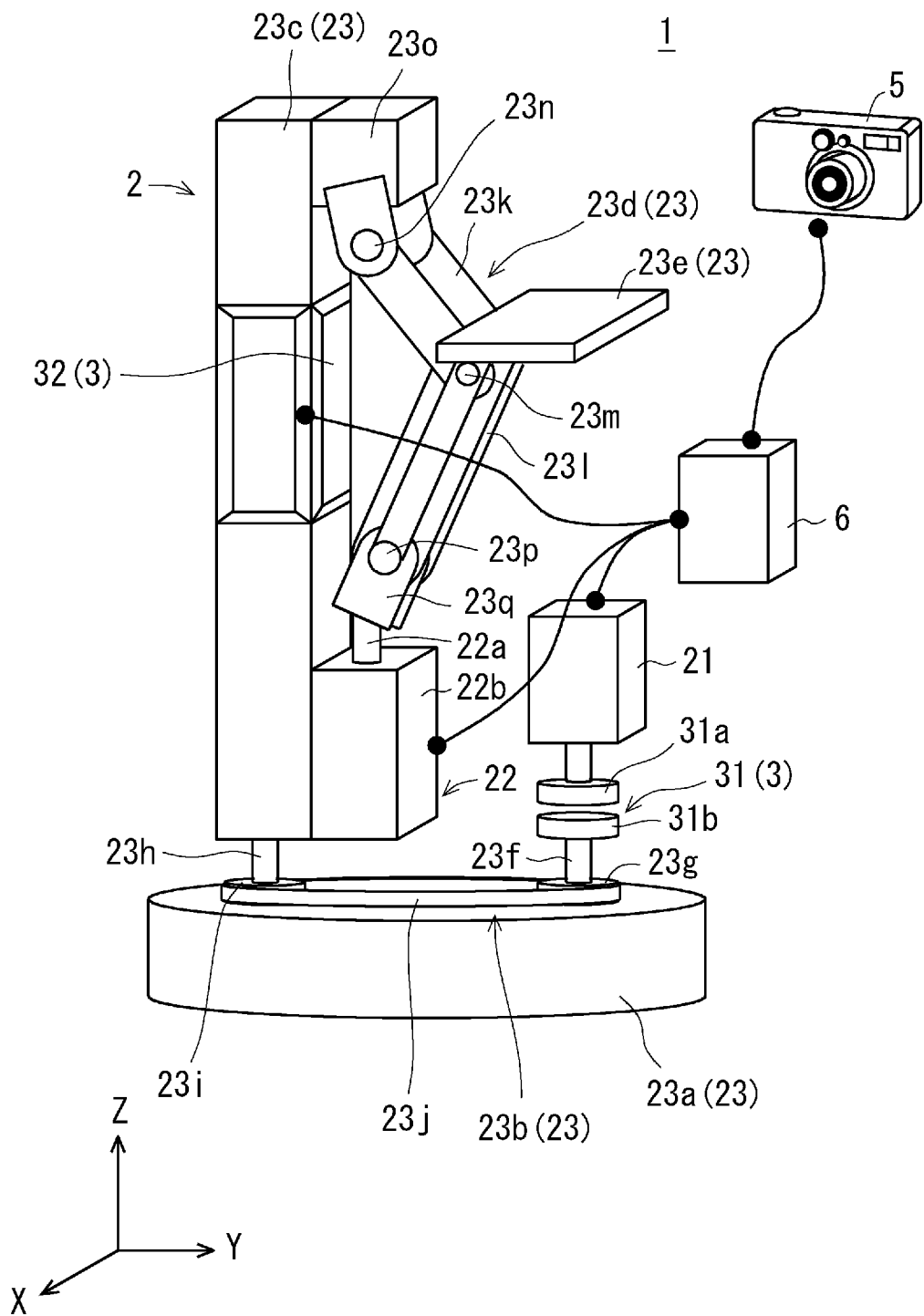
FIG. 1 schematically shows a configuration of a collaborative robot system according to a embodiment.
Figure 2:
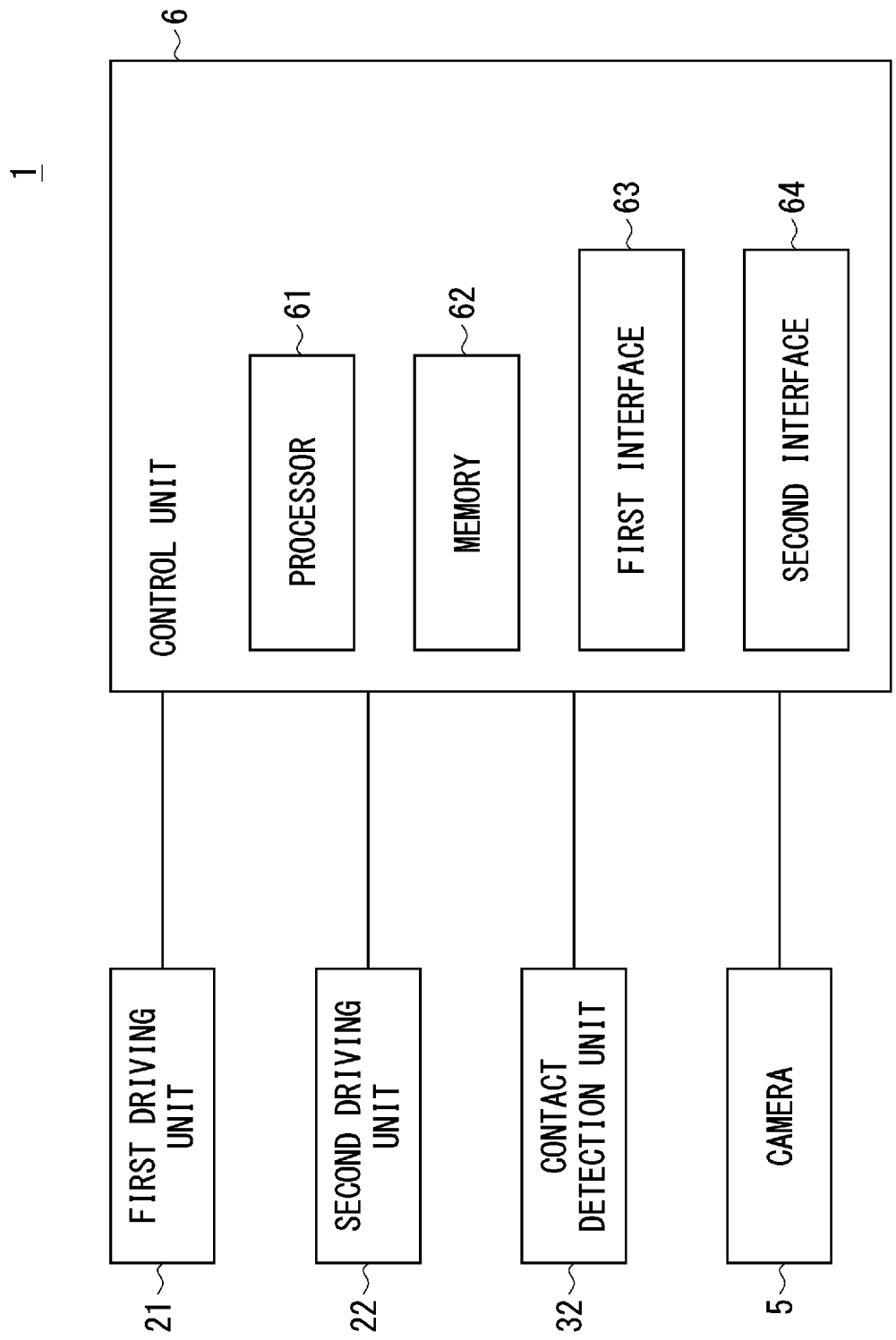
FIG. 2 is a block diagram showing a control system of the collaborative robot system according to the embodiment.
Figure 3:
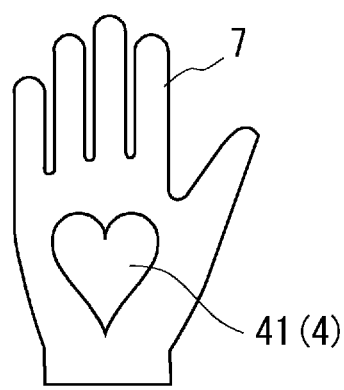
FIG. 3 shows a front side of a glove provided with a first work instruction marker.
Figure 4:
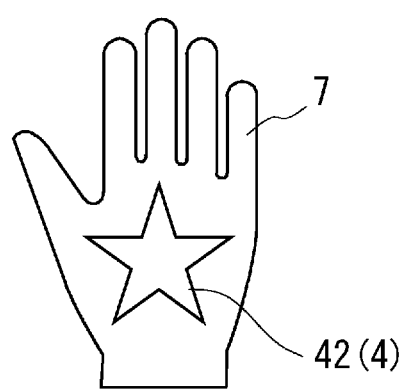
FIG. 4 shows a rear side of a glove provided with a second work instruction marker.

FIG. 1 schematically shows a configuration of a collaborative robot system according to this embodiment. FIG. 2 is a block diagram showing a control system of the collaborative robot system according to this embodiment. FIG. 3 shows a front side (i.e., a palm side) of a glove provided with a first work instruction marker. FIG. 4 shows a rear side (i.e., a back of a hand) of the glove provided with a second work instruction marker.

A collaborative robot system 1 according to this embodiment is preferable as a collaborative robot system assembled by an operator and for executing tasks in collaboration with the operator. In the following description, in order to clarify the description, a configuration of a collaborative robot 2 in the state of FIG. 1 will be described using a three-dimensional coordinate system (XYZ coordinate system).

As shown in FIGS. 1 to 4, the collaborative robot system 1 includes, for example, the collaborative robot 2, a safety securing unit 3, a work instruction marker 4, a camera 5, and a control unit 6. The collaborative robot 2 is configured, for example, to provide a tool to the operator and to collect the tool from the operator in order to collaborate with the operator in the task of joining a joining member to a member to be joined.

However, the collaborative robot 2 is not limited to, for example, a robot arm and instead may be a transport conveyor or a transport lift as long as the collaborative robot 2 is configured to be able to collaborate a task with an operator. Here, the collaborative robot 2 is smaller than a general industrial robot, and for example, the number of driving shaft may be three or less.

The collaborative robot 2 includes, for example, a first driving unit 21, a second driving unit 22, and an operation unit 23. The first driving unit 21 includes, for example, a rotary actuator having a motor and a reduction gear. The second driving unit 22 includes a linear actuator having an electric cylinder or the like. The outputs of the first driving unit 21 and the second driving unit 22 may be smaller than the outputs of an actuator or the like included in a general industrial robot.

The operation unit 23 is operated by driving forces of the first driving unit 21 and the second driving unit 22 to perform the above-described task. The operation unit 23 includes a base unit 23a, a first drive transmission unit 23b, a support 23c, a second drive transmission unit 23d, and a mounting table 23e.

The base unit 23a has, for example, a flat plate shape substantially parallel to an XY plane. The first drive transmission unit 23b includes a first rotary shaft 23f, a first pulley 23g, a second rotary shaft 23h, a second pulley 23i, and a belt 23j.

The first rotary shaft 23f projects from the base unit 23a toward the positive side of the Z-axis, and is provided on the base unit 23a rotatably around the Z-axis. An output shaft of the first driving unit 21 is connected to an end part of the first rotary shaft 23f on the positive side of the Z-axis so as to transmit the driving force of the first driving unit 21. The first pulley 23g is fixed to the first rotary shaft 23f. Here, a center axis of the first rotary shaft 23f and a center axis of the first pulley 23g are arranged so as to substantially overlap each other.

The second rotary shaft 23h is spaced from the first rotary shaft 23f in the Y-axis direction. The second rotary shaft 23h protrudes from the base unit 23a toward the positive side of the Z-axis, and is provided on the base unit 23a rotatably around the Z-axis. The second pulley 23i is fixed to the second rotary shaft 23h. Here, a center axis of the second rotary shaft 23h and a center axis of the second pulley 23i are arranged so as to substantially overlap each other.

The support 23c extends in the Z-axis direction. An end part of the support 23c on the negative side of the Z-axis is fixed to an end part of the second rotary shaft 23h on the positive side of the Z-axis. The support 23c has, for example, a substantially square prism shape, and is disposed in such a way that a center axis of the support 23c and a center axis of the second rotary shaft 23h substantially overlap each other. However, the shape of the support 23c is not limited to the above as long as it is a columnar shape extending in the Z-axis direction.

In the state of FIG. 1, a surface of the support 23c on the positive side of the Y-axis is disposed substantially parallel to the XZ plane. The second driving unit 22 is fixed to a part of the support 23c on the negative side of the Z-axis on a surface of the support 23c on the positive side of the Y-axis. Here, a rod 22a of the second driving unit 22 protrudes from a cylinder 22b of the second driving unit 22 toward the positive side of the Z-axis and is extended and contracted in the Z-axis direction.

The second drive transmission unit 23d is a V-shaped pantograph mechanism when viewed from the X-axis direction. That is, the second drive transmission unit 23d includes a first link unit 23k and a second link unit 23l disposed on the negative side of the Z-axis with respect to the first link unit 23k, and an end part of the first link unit 23k on the negative side of the Z-axis is rotatably connected to an end part of the second link unit 23l on the positive side of the Z-axis with a rotary shaft 23m extending in the X-axis direction interposed therebetween.

An end part of the first link unit 23k on the positive side of the Z-axis is rotatably connected to a fixing jig 23o fixed to an end part of the support 23c on the positive side of the Z-axis with a rotary shaft 23n extending in the X-axis direction interposed therebetween. An end part of the second link unit 23l on the negative side of the Z-axis is rotatably connected to a fixing jig 23q fixed to an end part of the rod 22a of the second driving unit 22 on the positive side of the Z-axis with a rotary shaft 23p extending in the X-axis direction interposed therebetween.

The mounting table 23e has, for example, a plate shape substantially parallel to the XY plane. The part of the mounting table 23e on the negative side of the Y-axis is fixed near a part where the first link unit 23k is connected to the second link unit 23l of the second drive transmission unit 23d. However, the mounting table 23e may include a mounting surface on which a tool or the like is to be mounted on the surface of the mounting table 23e on the positive side of the Z-axis.

With such a structure, when the first driving unit 21 is driven, the mounting table 23e is rotated around the Z-axis through the first drive transmission unit 23b and the support 23c. When the rod 22a of the second driving unit 22 is extended to the positive side of the Z-axis, the mounting table 23e is pushed out to the positive side of the Y-axis through the second drive transmission unit 23d. On the other hand, when the rod 22a of the second driving unit 22 is contracted to the negative side of the Z-axis, the mounting table 23e is pulled to the negative side of the Y-axis through the second drive transmission unit 23d.

The safety securing unit 3 is means for protecting the operator when the operator comes into contact with the collaborative robot 2. The safety securing unit 3 includes, for example, a magnet coupling 31 and a contact detection unit 32.

The magnet coupling 31 is disposed between the output shaft of the first driving unit 21 and the first rotary shaft 23f of the first drive transmission unit 23b in the operation unit 23.

Specifically, the magnet coupling 31 is magnetically connected in such a state that a first magnet 31a having a flat plate shape substantially parallel to the XY plane and a second magnet 31b having a flat plate shape substantially parallel to the XY plane are superposed in the Z-axis direction. The first magnet 31a is fixed to the output shaft of the first driving unit 21. The second magnet 31b is fixed to the first rotary shaft 23f of the first drive transmission unit 23b in the operation unit 23.

With such a structure, when the mounting table 23e is rotated and the mounting table 23e is brought into contact with the operator, the magnetic connection between the first magnet 31a and the second magnet 31b is canceled, and the transmission of the driving force from the first magnet 31a to the second magnet 31b is canceled. Therefore, the mounting table 23e is prevented from being further rotated, and the mounting table 23e does not strongly push the operator.

The contact detection unit 32 is fixed to the surface of the support 23c on the positive side of the Y-axis, and is disposed between the support 23c and the second drive transmission unit 23d. The contact detection unit 32 may include, for example, a flexible contact sensor composed of a piezoelectric element whose surface is covered with an elastic material such as sponge. However, the contact detection unit 32 may be disposed, for example, to cover all side surfaces of the support 23c as long as the contact detection unit 32 is configured to be able to detect that the operator comes into contact with the support 23c.

The work instruction marker 4 is a mark for causing the collaborative robot 2 to execute a desired operation. In this embodiment, as shown in FIGS. 3 and 4, a first work instruction marker 41 and a second work instruction marker 42 are provided as the work instruction marker 4.

As shown in FIG. 3, the first work instruction marker 41 is provided on the front side of the hand of the glove 7 worn by the operator. The first work instruction marker 41 is a mark for moving the mounting table 23e to the negative side of the Y-axis.

As shown in FIG. 4, the second work instruction marker 42 is provided on the rear side of the hand of the glove 7 worn by the operator. The second work instruction marker 42 is a mark for moving the mounting table 23e to the positive side of the Y-axis.

The camera 5 is a general camera having an imaging element such as CMOS (Complementary Metal Oxide Semiconductor). The camera 5 captures an image of the work instruction marker 4 provided on the glove 7 worn by the operator.

The control unit 6 is a control apparatus for controlling the collaborative robot 2, and includes a processor 61, a memory 62, a first interface 63, and a second interface 64. The processor 61, the memory 62, the first interface 63, and the second interface 64 are connected to each other via a data bus or the like.

The processor 61 reads software (i.e., a program) from the memory 62 and executes it to thereby execute processing for causing the collaborative robot 2 to execute a desired operation. Specifically, the processor 61 performs processing for controlling the first driving unit 21 and the second driving unit 22 based on detection information of the contact detection unit 32 of the safety securing unit 3 and the camera 5. The details of this processing will be described later.

The processor 61 may be, for example, a microprocessor, a Micro Processor Unit (MPU), or a Central Processing Unit (CPU). The processor 61 may include a plurality of processors.

The memory 62 is composed of, for example, a combination of a volatile memory and a non-volatile memory. The memory 62 is used to store the program including one or more instructions to be executed by the processor 61, data used for processing to cause the collaborative robot 2 to execute a desired operation, and so on.

The first interface 63 is an input/output unit used for communicating with the first driving unit 21, the second driving unit 22, the contact detection unit 32 of the safety securing unit 3, and the camera 5. The second interface 64 is an input/output unit used for communicating with an input apparatus, such as the operator's computer, for finely adjusting the operation of the collaborative robot 2.

The above-described control unit 6 is an apparatus that functions as a computer. Since the outputs of the first driving unit 21 and the second driving unit 22 are smaller than the output of a motor or the like of a general industrial robot as described above, the control unit 6 may have a simpler configuration as compared with a control unit for controlling the general industrial robot, and may be a general-purpose product such as Raspberry Pi (registered trademark).

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), and optical magnetic storage media (e.g. magneto-optical disks). Examples of non-transitory computer readable media further include CD-ROM (Read Only Memory), CD-R, and CD-R/W. Examples of non-transitory computer readable media further include semiconductor memories (such as mask ROM, PROM, EPROM, flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Next, an operation of the collaborative robot system 1 according to this embodiment will be described. Here, it is assumed that a tool for joining a joining member to a member to be joined is mounted on the mounting table 23e. It is also assumed that the mounting table 23e is disposed, for example, toward the positive side of the X-axis. Further assume that the rod 22a of the second driving unit 22 is in the most contracted state and that the mounting table 23e is closest to the support 23c. Such a state is assumed to be an initial state of the collaborative robot 2.

In such an initial state, when the operator working on the positive side of the Y-axis with respect to the collaborative robot 2 shows the second work instruction marker 42 provided on the glove 7 to the camera 5, the camera 5 captures an image of the second work instruction marker 42 and transmits captured information to the control unit 6.

Next, the control unit 6 controls the first driving unit 21 and the second driving unit 22 so that the mounting table 23e moves to the positive side of the Y-axis. Then, the first driving unit 21 is driven, and the mounting table 23e is rotated around the Z-axis via the first drive transmission unit 23b and the support 23c, and the mounting table 23e is disposed toward the positive side of the Y-axis.

Next, the second driving unit 22 is driven to extend the rod 22a of the second driving unit 22 to the positive side of the Z-axis, and the mounting table 23e is pushed out to the positive side of the Y-axis via the second drive transmission unit 23d. Thus, the collaborative robot system 1 can provide the operator with a tool for collaborating with the operator in the task of joining the joining member to the member to be joined.

On the other hand, when the operator has finished using the tool and shows the first work instruction marker 41 provided on the glove 7 to the camera 5, the camera 5 captures an image the first work instruction marker 41 and transmits captured information to the control unit 6.

Next, the control unit 6 controls the first driving unit 21 and the second driving unit 22 so that the collaborative robot 2 returns to the initial state. Then, the second driving unit 22 is driven to contract the rod 22a of the second driving unit 22 to the negative side of the Z-axis, and the mounting table 23e is pulled to the negative side of the Y-axis via the second drive transmission unit 23d.

Thus, the first driving unit 21 is driven, and the mounting table 23e is rotated around the Z-axis via the first drive transmission unit 23b, the support 23c, and the like, and the mounting table 23e is disposed toward the positive side of the X axis. In this manner, the collaborative robot system 1 can collect the tool from the operator in order to collaborate with the operator in the task of joining the joining member to the member to be joined.

As described above, in the collaborative robot system 1 according to this embodiment, the tool can be easily provided to the operator and also collected from the operator by only showing the work instruction marker 4 to the camera 5. Here, when the operator comes into contact with the mounting table 23e, the magnetic connection of the magnet coupling 31 of the safety securing unit 3 is released, so that the transmission of the driving force from the first driving unit 21 to the first rotary shaft 23f is released. It is thus possible to prevent the mounting table 23e from being further rotated, and the operator from being strongly pushed by the rotation of the mounting table 23e.

Further, when the contact detection unit 32 of the safety securing unit 3 detects contact with the support 23c based on the detection information, the control unit 6 controls the second driving unit 22 so that, for example, the rod 22a of the second driving unit 22 is extended to the positive side of the Z-axis. It is thus possible to prevent the operator from being caught between the support 23c and the second drive transmission unit 23d. By such operations, even if the operator comes into contact with the collaborative robot 2, the operator can be protected, and the collaborative robot 2 can be operated near the operator.

Next, a flow of assembling the collaborative robot system 1 according to this embodiment will be described. Note that, for example, in the step in which the operator selects each element, the operator can make a selection through the input apparatus from various lists displayed on a display surface of the input apparatus.

First, the operator selects the first driving unit 21 and the second driving unit 22 from a drive source list including a plurality of kinds of rotary actuators and linear actuators having different outputs and strokes in order to cause the collaborative robot system 1 to execute a desired operation. The operator selects the operation unit 23 from an operation mechanism list including a plurality of kinds of link mechanisms, cam mechanisms, etc.

The operator selects the safety securing unit 3 from a safety ensuring list including a magnet coupling, a contact sensor, a cover, etc. Further, the operator selects the work instruction marker 4 and the camera 5 from an operation instruction list including a plurality of kinds of work instruction markers, a camera, a sensor, and the like for causing the first driving unit 21 and the second driving unit 22 to execute a desired operation.

In addition to the first driving unit 21, the second driving unit 22, the operation unit 23, the safety securing unit 3, the work instruction marker 4, and the camera 5 selected by the operator, the combination of the control unit 6 and these components is brought into a site as an assembly set, and the operator performs temporary assembly. Here, the control unit 6 may also be selected from a control list including a plurality of types of control apparatuses.

Then, the operator connects the input apparatus to the second interface 64 of the control unit 6, selects a program for causing the collaborative robot system 1 to execute a desired operation using the input apparatus, and installs the program in the control unit 6.

After that, the operator causes the collaborative robot system 1 to execute a desired operation, and performs fine adjustment of the operation of the collaborative robot 2 using the input apparatus through the second interface 64 of the control unit 6. In this way, the assembly of the collaborative robot system 1 is completed.

Since the collaborative robot system 1 includes the safety securing unit 3, even if the operator comes into contact with the collaborative robot 2, the operator can be protected, and the collaborative robot 2 can be operated near the operator.

Moreover, since the control unit 6 includes the second interface 64, the operator can, for example, finely adjust the operation of the collaborative robot 2 using the input apparatus at a site through the second interface 64.

Furthermore, the operator can select each element for causing the collaborative robot system 1 to execute a desired operation, and the collaborative robot system 1 desired by the operator can be easily configured.

Although the flow for assembling the collaborative robot system 1 has been described in this embodiment, the configuration of the collaborative robot system 1 is not limited to the above, and may be a configuration in which the operator can collaborate with the collaborative robot in working on a task, and the operator can configure an assembly set by appropriately selecting necessary elements from various lists.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A collaborative robot system assembled by an operator for executing a task in collaboration with the operator, the collaborative robot system comprising:
   a driving unit;
   an operation unit configured to operate by a driving force of the driving unit to execute the task;
   a work instruction marker provided on a glove worn by the operator, the work instruction marker for causing the operation unit to perform a preset operation;
   a camera that images the work instruction marker and acquires imaging information;
   a control unit configured to control the driving unit to execute the preset operation based on the imaging information;
   a program executed by the control unit;
   a safety securing unit including a cover covering the operation unit or a sensor configured to detect contact of the operator with the operation unit; and
   an interface, an input apparatus of the operator being connected to the interface in order to modify the program.

2. The collaborative robot system according to claim 1, wherein
   the operation unit includes three or less operating shafts.

3. An assembly set for a collaborative robot system comprising:
   a combination of the driving unit, the operation unit, the work instruction marker, the camera, the program, the safety securing unit, and the interface for assembling the collaborative robot according to claim 1.

4. The collaborative robot system according to claim 1, wherein
   the work instruction marker includes:
   a first work instruction marker provided on a front side of the glove for causing the operation unit to execute a preset first operation, and
   a second work instruction marker provided on a back side of the glove for causing the operation unit to perform a preset second operation.

* * * * *